United States Patent [19]

Lucas et al.

[11] Patent Number: 4,631,704
[45] Date of Patent: Dec. 23, 1986

[54] METHODS AND DEVICES FOR CHARGED BEAM ACCESSIBLE DATA STORAGE

[75] Inventors: Ronald J. Lucas, Columbia; Ivan L. Berry, Ellicott City, both of Md.; John C. Wolfe, Houston, Tex.

[73] Assignee: The University of Houston, Houston, Tex.

[21] Appl. No.: 561,747

[22] Filed: Dec. 15, 1983

[51] Int. Cl.⁴ .............................................. G11C 11/46
[52] U.S. Cl. .................................. 365/126; 365/118; 365/128
[58] Field of Search ............... 365/126, 127, 128, 118, 365/237; 369/100, 109

[56] References Cited

U.S. PATENT DOCUMENTS

| | | | |
|---|---|---|---|
| 2,970,534 | 2/1961 | Marron | 101/149.4 |
| 3,316,119 | 4/1967 | Anderson et al. | 117/36.8 |
| 3,351,948 | 11/1967 | Bonn | 365/127 |
| 3,760,383 | 9/1973 | Wolfe et al. | 365/237 |
| 3,787,873 | 1/1974 | Sato et al. | 346/1.1 |
| 3,789,421 | 1/1974 | Chivian et al. | 346/1.1 |
| 3,889,272 | 6/1975 | Lou et al. | 346/1.1 |
| 4,081,794 | 3/1978 | Parks et al. | 365/118 |
| 4,133,047 | 1/1979 | Levinthal | 365/118 |
| 4,245,229 | 1/1981 | Stephens | 346/135.1 |
| 4,287,572 | 9/1981 | Webster | 365/128 |
| 4,344,816 | 8/1982 | Craighead et al. | 204/192 E |
| 4,360,895 | 11/1982 | Cornet | 365/127 |
| 4,422,159 | 12/1983 | Craighead et al. | 365/127 |
| 4,463,089 | 7/1984 | Bouldin | 365/127 |

*Primary Examiner*—Terrell W. Fears
*Attorney, Agent, or Firm*—Arnold, White & Durkee

[57] ABSTRACT

Charged beam accessible data storage methods and devices involve a storage medium having an array of protrusions formed on a thermally insulative, substantially charged beam transparent base. The protrusions, made of high contrast material, can be selectively melted by a charged beam, such as an electron beam, in order to decrease the protrusions' aspect ratio and to increase their energy absorptive action when scanned by a charged beam. Since the melted protrusions do not wet on the base, the protrusions quickly assume a spherical bead shape when melted due to favorable surface tension forces. The bi-level charged beam absorption characteristics of the melted and unmelted protrusions provide the two "on" or "off" stored data states.

9 Claims, 10 Drawing Figures

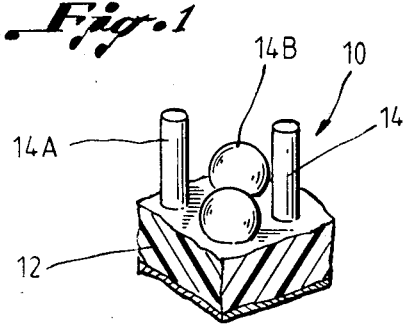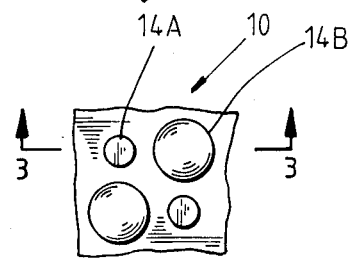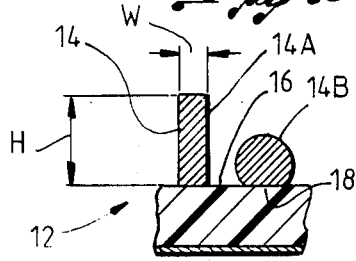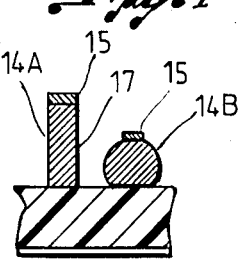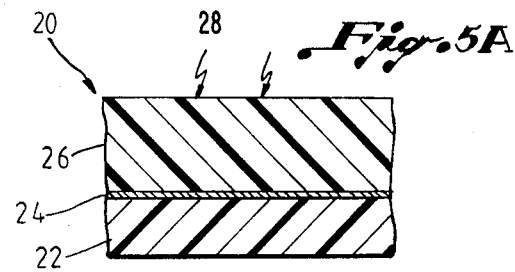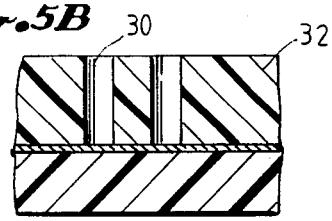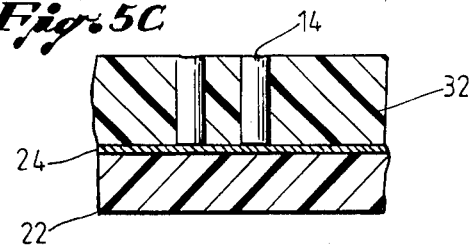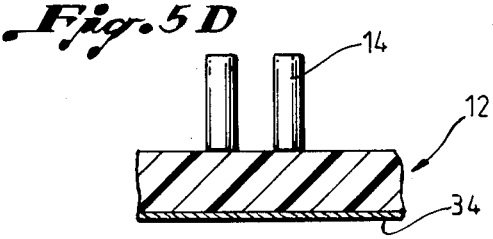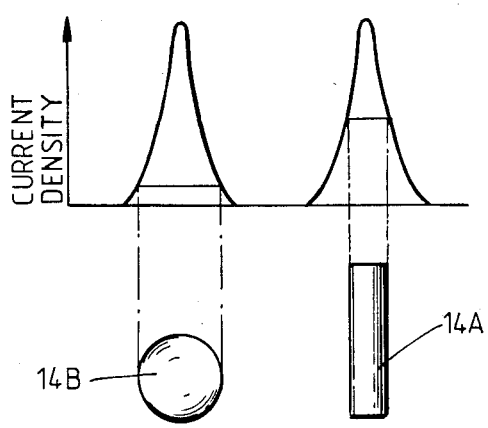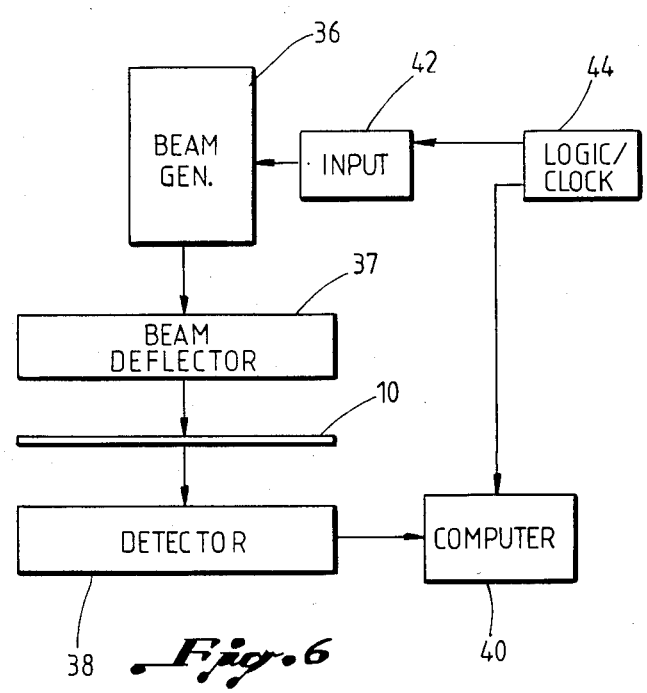

METHODS AND DEVICES FOR CHARGED BEAM ACCESSIBLE DATA STORAGE

BACKGROUND OF THE INVENTION

1. Field of the Invention

This invention relates to archival memories and particularly to electron or ion beam accessible memories for storing extremely large data bases. More particularly, the present invention relates to methods and devices for data storage in archival, beam accessible memories.

2. Brief Description of the Background Art

Fixed head magnetic media devices used for data storage in modern computer systems are limited both by slow access times and the large physical data storage media. One consequence is that on-line data bases larger than about $10^{12}$ bits are not feasible. Beam accessible memories have the potential for solving these problems. Both electron and ion beams are attractive because of their ease of deflection, small spot sizes and appreciable energy density.

The pioneering work of Wolfe, Bennett and Ledges in 1969 demonstrated that 100 nm. recording at 10 Mbit/second data rates by electron beam micromachining of arsenic/selenium glasses at power levels of $10^7$ W/cm.$^2$ and 10 kV accelerating voltage were possible. They subsequently showed that the bit size could be reduced to 70 nm. by using a gold loaded target and 4 kV beam voltage to improve localization of the absorbed power. Information was stored by selectively evaporating pits in the film. Secondary emission contrast was used for information retrieval. The main drawback of this approach resulted from the unpredictability of secondary emission contrast for readout. Since secondary emission yield is sensitive to surface contamination and charge on the memory target, the archival lifetime of the data was short and unpredictable.

In U.S. Pat. No. 4,081,794, Kirkpatrick and Parks disclosed a storage scheme where junction microdiodes were formed by electron beam alloying. They subsequently showed that the power densities required to achieve high resolution alloying on these highly conductive substrates cannot be obtained with state of the art electron optics. The high thermal conductivity of the silicon substrate of the diode made it impossible to localize the beam energy.

A method for writing on an archival memory target wherein a masking layer is melted, is disclosed in U.S. Pat. No. 4,287,572. The melted material "balls up" when it solidifies to create a transmission "window" for a scanning electron beam.

Although archival electron beam addressed memories have been the subject of active research for over fifteen years, there is still an unfulfilled demand for a memory system that possesses both good contrast and high thermal isolation between bit memory locations.

SUMMARY OF THE INVENTION

It is a primary object of the present invention to provide a charged beam accessible memory device that is capable of both high contrast between the "on" and "off" states of each bit and good thermal isolation between the various bits.

It is another object of the present invention to provide a charged beam accessible memory device that is capable of quick conversion to the second of two data states.

It is also an object of the present invention to provide methods for reading and writing data into and out of a charged beam accessible data storage device.

These and other objects of the present invention are achieved by an archival charged beam accessible data storage device, including a low heat conducting, charged beam transparent substrate and an array of charged beam absorbing protrusions. The protrusions, which extend away from the substrate, are formed substantially of material that does not wet in the liquid state on the substrate.

In accordance with another embodiment of the present invention, an archival charged beam accessible data storage device includes a substrate and an array of charged beam absorbing protrusions. The protrusions extend away from the substrate, with some of the protrusions being elongate and having aspect ratios of at least three. The rest of the protrusions are generally spherical and have aspect ratios of less than three.

In accordance with yet another embodiment of the present invention, an archival charged beam accessible data storage device includes a low heat conducting, substantially charged beam transparent substrate. An array of spaced apart, discrete, charged beam absorptive protrusions extend away from the substrate. The protrusions are connected to one another by the substrate.

In accordance with still another embodiment of the present invention, a method for creating an archival charged beam accessible data storage device includes the step of forming a storage medium with a base having an array of elongate, charged beam absorbing protrusions formed thereon. The protrusions have aspect ratios of at least three. Certain of the protrusions are selectively melted to form widened protrusions having aspect ratios of less than three.

In accordance with still another embodiment of the present invention, a method of implementing an archival charged beam accessible memory includes the step of forming a storage medium having a base with an array of charged beam absorbing protrusions formed thereon. Data is written into the memory by selectively melting the protrusions using a charged beam at a higher power level. Modified protrusions are formed having an increased charged beam absorption capacity. The memory is read by exposing the protrusions to a charged beam at a lower power level. The unabsorbed energy from the protrusions, when exposed to the charged beam of lower power, is then detected.

BRIEF DESCRIPTION OF THE DRAWINGS

FIG. 1 is a schematic, greatly enlarged, perspective view of a small portion of one embodiment of the present invention;

FIG. 2 is a top plan view of the embodiment shown in FIG. 1;

FIG. 3 is a cross-sectional view taken generally along the line 3—3 in FIG. 2;

FIG. 4 is a cross-sectional view, taken as in FIG. 3, through a different embodiment;

FIG. 5 including FIGS. 5a–5d schematically illustrates one technique for producing the embodiment shown in FIG. 1;

FIG. 6 is a schematic diagram of an apparatus useful in accessing and encoding data on the embodiment of the present invention shown in FIG. 1; and FIG. 7 schematically shows the relationship between the configuration of the protrusions in the embodiment shown in FIG. 1 and the beam width of the incident reading charged beam, plotted as "current density" versus position across the beam.

DESCRIPTION OF A PREFERRED EMBODIMENT

Referring to the drawing wherein like reference characters are used for like parts throughout the several views, a beam accessible data storage device 10, shown in FIG. 1, includes a base 12 made of a material generally transparent to charged beams, such as electron or ion beams, and a plurality of spaced apart, discrete, upstanding protrusions 14. The protrusions 14 are preferably made of a high contrast material, meaning that the material substantially affects the transmission or reflection of an incident charged beam. While in the illustrated embodiment, the protrusions 14 have a generally columnar or cylindrical configuration, a variety of shapes may be used and it is not intended that the present invention be limited to the specific configuration illustrated. However, it is preferable that the aspect ratio (the ratio of the height (H) to the width (W)) of the protrusions 14 be greater than or equal to about three. A particularly useful range of aspect ratios is from about three to five.

The protrusions 14 are advantageously made of a high atomic number material that is absorptive to charged beams, such as gold or low melting temperature gold alloys including tin, silicon, or germanium alloys. The protrusion 14 material may have a relatively low melting point, advantageously less than 1200° C., but greater than 200° C. Lower melting point materials can be used as the protrusion 14 material by incorporating a charged beam absorbing cap 15 at the top of the protrusion body 17, as indicated in FIG. 4. For example, the body 17 may be made of bismuth and the cap 15 of gold or platinum.

The base 12 is advantageously made of a thermally insulating, low atomic number, low density, material that is substantially transparent to charged beams. Thus, there is high contrast between the transmissive or reflective characteristics of the base 12 as compared to those of the protrusions 14. In addition, the various protrusions 14 are thermally isolated from one another by the base 12. The thermal conductivity of the base 12 is ideally less than 0.05 W/cm.° C. Suitable materials for the base 12 include plastic, such as polyimide, or inorganic materials including materials containing silicon as a major component, such as silicon dioxide, silicon carbide, silicon nitride, and silicon, materials containing aluminum as a major component, such as aluminum oxide, and laminates of the above materials.

The density of the protrusions 14 on the base 12 may be in the range of $10^{10}$ bits per square centimeter. While not intended to be limiting on the scope of the present invention, protrusion 14 widths on the order of 50 nm. with the center to center spacing between adjacent protrusions 14 on the order of 100 nm. may be utilized. The base 12 may, for example, have a thickness of about 250 nm.

In order to selectively record a second of two data states, the protrusions 14 are selectively melted. The melted protrusions 14 are transformed from the elongate configuration, indicated at 14A in FIGS. 1-3, to the broadly spherical shape, indicated at 14B in FIGS. 1-3. Since the spherical shape 14B is a preferred geometric configuration because of its greater stability and lower energy, this transformation from elongate to spherical morphology is preferentially accomplished. Moreover, by selecting the material forming the protrusions 14 to be non-wetting in its molten state, on the material forming the upper surface 16 of the base 12, the melted protrusion 14B naturally forms the spherical or bead shape, illustrated in FIG. 3, with a slightly flattened bottom 18. However, a hemispherical shape is also suitable for the protrusions 14B. The protrusions 14 may be spaced so that adjacent protrusions 14B are in contact with one another. The protrusions 14B may have widths on the order of 100 nm., for example.

While a variety of techniques may be utilized for forming the protrusions 14 on the base 12, electron beam lithography may be used with plastic membranes or silicon substrates. In one approach, the devices 10 are fabricated on silicon substrates from which they are subsequently removed. In another approach, the devices 10 are fabricated directly on free-standing membranes. Variations of trilevel electron beam lithography are used to control proximity effects in the solid substrate process. Proximity effects are absent in electron beam lithography on membranes. Forward scattering may be controlled in both cases by using a high beam voltage.

In the membrane fabrication technique, to make the membrane, a silicon wafer is lightly oxidized for 12 hours at 250° C. Then a 40 nm. thick gold parting layer is sputter deposited on the wafer. Polyamic acid (250 nm., Dupont Pyralin PI-2555) is spun on the gold parting layer and cured in air at successive temperature stages of 150° C., 200° C. and 250° C., for one hour each. A support ring is bonded with epoxy to the polyimide top layer formed by the polyamic acid. The mounted polyimide membrane and the gold parting layer are peeled from the oxidized wafer. The parting layer is then removed by RF sputter etching. While the use of a gold parting layer improves the yield of the process, it is not absolutely necessary and is often omitted. When the parting layer is omitted, the polyimide film may be cured in air to manufacturer's specifications.

A substrate 20, shown in FIG. 5A, includes the polyimide membrane 22, made as described above, a gold plating base 24, and a resist layer 26, conveniently about 400 nm. of 950 kilogram molecular weight poly (methylmethacrylate). The resist layer 26 is selectively exposed to an electron beam at an X-Y grid array of spaced locations 28. One electron beam useful for the present purposes has a 30 kV accelerating voltage, a 0.08 nA beam current, a 20 nm. estimated beam diameter and approximately $10^{-4}$C./cm$^2$ dose. The resist layer 26 is then developed for 30 seconds in a 3 to 1 mixture of isopropyl alcohol and methylisobutylketone and rinsed in isopropyl alcohol.

The array of holes 30 in the resist layer 26 (FIG. 5B), defined by electron beam lithography, is filled by electroplating 250 nm. of gold into the resist mold 32 (FIG. 5C). The polyimide film is gold plated using a commercial electroplating solution, such as Selrex BDT-510. A bath temperature of 28° C. and a pH of 8.5 may be used. The plating rate may be approximately 45 nm. per minute. The resist mold 32 is then stripped by gently flowing acetone over the resist layer 26. The gold plating layer 24 can be removed by sputter etching. Thereafter, a 20 nm. thick titanium ground plane 34 is sputter deposited on the reverse side of the membrane 22 to form the completed device 10, with base 12 and protrusions 14 (FIG. 5D).

The alternative, solid substrate fabrication process proceeds in generally the same manner. However, instead of using 250 nm. of polyamic acid to form the polyimide membrane, 600 nm. of polyimide is spun onto the wafer/parting layer composite. The thicker polyimide film diffuses back scattered electrons before they reach the active resist layer to avoid proximity effects. After forming the polyimide layer, a 20 nm. thick gold plating base is sputter deposited on the remaining exposed side of the film layer. Then resist (400 nm.) is spun onto the just applied gold plating base. The holes in the resist mold are produced as before and the gold resist mold electroplating step is the same as in the membrane fabrication process. The plated resist mold is washed and dried at 150° C. for thirty minutes, and then the resist and plating base are stripped. Next the film membrane is removed from the silicon substrate, using the bonded support ring as described previously, by peeling away the membrane and the parting layer, and thereafter removing the parting layer by R-F sputter etching. The polyimide film is plasma ashed on its reverse side to obtain the 250 nm. thickness. Lastly, a 20 nm. thick titanium ground plane is secured on the reverse side.

Data storage and withdrawal from the device 10 may be accomplished by a beam generator 36 and a detector 38, as shown in FIG. 6. A variety of beam generators 36 may be used as the generator, including both electron and ion beam generators. For example, the beam generator 36 may be constructed according to the teaching of U.S. Pat. No. 3,760,383 to Wolfe, et al., hereby expressly incorporated by reference herein, to achieve a beam of extremely small focused spot diameter, on the order of 0.1 microns, and high current density capability, on the order of 1,000 amperes per square centimeter. The beam produced by the beam generator 36 is directed to scan the device 10 by a conventional beam deflector system 37, for example as also described in the Wolfe U.S. Pat. No. 3,760,383. A detector 38 may be positioned beneath the device 10 or it may be secured integrally on the base 12, if desired. The detector 38 may take a variety of forms and may be conventionally implemented by a diode detector or a channel electron multiplier having dimensions comparable to the dimensions of the array of protrusions 14 on the device 10. The detector 38 produces a time spaced series of "on" and "off" pulses which are translated and recorded by a computer 40.

The electron emission system of the beam generator 36 may use field aided thermionic emission with a cathode (not shown) including a filamentary hairpin having a welded single crystal oriented tungsten needle of minute size, located at the emissive cathode tip. Sintered zirconium is applied in a ball at the base of the needle, so that upon heating of the hairpin and needle, the zirconium ball migrates as a solid up the needle to the tip. As described in the Wolfe patent, the emission system may also include an apertured anode and grid electrode structure for generating a spherical electric field configuration about the emissive cathode tip causing a high power density electron emission.

The beam is focused by an optical system with a pair of focus lenses (not shown) that provide a single stage imaging of the electrons emitted from the cathode tip. The cathode tip, which is at the object plane, is positioned at the focal point of the first lens and the device 10 which is in the image plane.

Modulation of the beam is accomplished by the deflector 37 which includes a modulation coil (not shown) that shifts the beam axis with respect to a limiting aperture at the generator 36 source. Beam shifting can be used to blank or turn off the beam between operations by driving the beam outside of an aperture.

A set of deflection coils (not shown) are provided in beam deflector 37, forward of the final focusing lens, for deflecting the beam in both the X and Y directions in the plane of the device 10. The beam generated by the beam generator 36 scans each of the protrusions 14 on the device 10 through the action of the deflector 37. Each time a protrusion 14 is scanned by the electron beam, it absorbs or reflects some of the incident radiation and transmits the remainder.

Depending on the configuration of the protrusions 14, a different amount of radiation is absorbed. More particularly, if the protrusion 14 is in the elongate configuration 14A, more radiation is transmitted because of the small cross-sectional size of the protrusion 14. However, if the protrusion 14 takes the configuration 14B, less radiation is transmitted because of the wider absorbing area. FIG. 7 shows the relationship between the beam width and the protrusion 14 width. Theoretically, the transmission is approximately 50% with the configuration 14A while the transmission is only 6% with the configuration 14B. Thus, the contrast is 0.88. The energy transmitted is detected by the detector 38 which converts the energy into a current pulse. These pulses are then interpreted by the computer 40 to determine the nature of the information recorded on the device 10.

With the energy absorbing cap 15 at the top of the protrusion body 17 (FIG. 4), a lower melting point material may be used for the remainder of each protrusion 14. During the writing phase, the cap 15 absorbs sufficient energy to melt the entire protrusion 14. The cap 15 itself need not melt. Because the protrusion 14 is now made substantially of a lower melting point material, the writing beam may be of lower power than that used with the embodiment shown in FIGS. 1–3. During the reading stage, the lower melting point, lower energy absorbing material that makes up the body 17 of the protrusion 14, is effective to absorb enough energy to provide adequate contrast.

It should be understood that both electron and ion beams may be used for scanning the device 10. For example, a liquid metal or a field ion source could replace the electron source described above with electrostatic lenses and deflectors replacing magnetic devices. In addition, although the present invention is illustrated in its preferred mode wherein transmitted energy is detected, it is also feasible to detect reflected energy by appropriately positioning the detector 38. While the cross-sectional area of the protrusions is sampled in the illustrated embodiment, the height of the protrusions 14, which decreases after melting, or any other property that is tied to surface topography, may be sampled.

Also, although the device 10 has been described as being stationary, the memory storage capacity can be increased by making the device 10 movable in one or more planes. For example, the device 10 could be moved relative to the beam generator 36 by an X-Y platen, as used in lithography systems, a disk format similar to magnetic and optical memories or a cylinder. Owing to the small size of the device 10, a second level of rapid mechanical access, such as a picker or juke box for a platen and disk, or axial translation for a cylinder could be incorporated to expand the system data capacity by many orders of magnitude.

It is efficient to use two different power levels for reading and writing. This may be accomplished in a variety of ways, including partially occluding the beam width with a blanking plate driven by a programmable pulse generator or by varying the beam filament temperature. A first higher power level beam is used to melt the protrusions 14A to form the protrusions 14B. Thereafter, a lower power level beam is used to read the various protrusions 14. However, if desired, two separate beam generators 36 and deflectors 37 may be utilized, one to write and one to read data. Generally, the size of the reading beam is adjusted so that about half of the beam current intercepts the protrusion 14A.

The writing or high power level beam is modulated as a function of the data input from the input 42, so that power is applied at the proper intervals during beam scanning over the surface of the device 10. Scan rates at least as high as $10^7$ data bits per second are feasible. The accelerating voltage of the beam, in an illustrative embodiment, may be 5 kV, with a half-power beam radius of 25 nm. and a write current of 200 nA. In contrast the read current is generally 5 to 10% of the write current.

The input 42 is conventionally a digital computer or the like although any source of digital or analog data may be used. A logic/clock network 44 is connected to the input 42 and output 40. The network 44 provides logic control and timing for the reading and writing operations. For example, the read out signal developed by the detector 38 is synchronized with the network 44 clock signal.

Through the use of two distinct materials for the protrusions 14 and the base 12, high contrast to charged beams and sufficient thermal isolation may be achieved. This is because the base 12 provides adequate thermal isolation while the protrusions 14 are of a material that provides sufficient contrast. With the present invention, the total power absorbed by a protrusion 14 adjacent a just melted protrusion 14B may be as low as 0.4% of the incident power.

Moreover, by making the protrusions 14 of a material that is nonwetting with respect to the material used as the upper surface 16 of the base 12, a very symmetrical bead or spherical shape may be achieved for the protrusions 14B. This is important to prevent cross-contamination between various bits of information stored as protrusions 14, and in addition, the spherical shape is highly reproducible and minimizes reading errors.

With the present invention, the two data states can be represented by protrusions 14 in significantly differentiated geometric configurations. The elongate protrusions 14A, advantageously having aspect ratios of at least three, are distinguished from the melted protrusions 14B, advantageously having aspect ratios of one or less.

The spherical shape is a preferred geometrical shape so that the transformation from the elongate configuration 14A to the spherical configuration 14B may occur in rapid fashion due to the large surface tension forces on the minute protrusions 14. In addition, since the transformation is accomplished by melting instead of evaporation, the phase transformation is generally accomplished at a much faster rate. Melting times of less than 20 nanoseconds are possible with the present invention.

The government of the United States has certain rights in this invention pursuant to National Security Agency contracts MDA904-80-C-0846 and MDA904-82-C-0429.

While the present invention has been described with respect to a limited number of embodiments, those skilled in the art will appreciate a number of variations, and it is intended within the appended claims to cover all such modifications and variations as fall within the true spirit and scope of the present invention.

What is claimed is:

1. A method for creating an archival charged beam accessible data storage device comprising the steps of:

forming a storage medium having a base with an array of elongate uniformly spaced, free standing, charged beam absorbing protrusions formed thereon, said protrusions having aspect ratios of at least about three; and selectively and individually melting certain of said protrusions with a charged beam to form widened protrusions having aspect ratios of less than three.

2. The method of claim 1 wherein said forming step includes the step of using electron beam lithography to form said protrusions.

3. The method of claim 1 wherein said selective melting step includes the step of exposing said protrusions to a higher of two charged beam power levels.

4. The method of claim 1 wherein said melting step includes the step of causing said protrusions to transform from an elongate shape to a generally spherical shape.

5. A method for implementing an archival charged beam accessible memory device comprising the steps of:

forming a storage medium having a base with an array of uniformly spaced, free standing, charged beam absorbing protrusions formed thereon;

writing data into said memory by selectively melting said protrusions using a charged beam at a higher of two power levels, and forming modified protrusions having an increased charged beam absorption capacity; and reading said memory by exposing each of said protrusions to a charged beam at a lower power level and detecting the energy unabsorbed by said protrusions when exposed to said lower power level charged beam.

6. The method of claim 5 wherein the reading step includes the step of using a charged beam such that approximately half of the beam current intercepts said protrusions before they are modified.

7. The method of claim 5 wherein said storage medium forming step includes the step of forming said storage medium of two diverse materials, a first material being a thermally insulative, substantially charged beam transparent material, and the second material being a substantially charged beam absorbing material, presenting high contrast to charged beams.

8. The method of claim 5 wherein said step of forming modified protrusions includes the step of forming generally spherical protrusions.

9. The method of claim 5 wherein said writing step includes the step of transforming certain of said protrusions from a first configuration, wherein said protrusions have aspect ratios of at least three, to a second configuration wherein said protrusions have aspect ratios of less than or equal to one.

* * * * *